US012389482B2

(12) United States Patent
Xie et al.

(10) Patent No.: US 12,389,482 B2
(45) Date of Patent: Aug. 12, 2025

(54) METHOD FOR ESTABLISHING MULTIPLE CONNECTIONS, AND NETWORK DEVICE AND SYSTEM

(71) Applicant: CHINA TELECOM CORPORATION LIMITED, Beijing (CN)

(72) Inventors: Weiliang Xie, Beijing (CN); Xin Zhang, Beijing (CN); Jiangang Chen, Beijing (CN); Peng Li, Beijing (CN); Na Lu, Beijing (CN); Zhijun Li, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 465 days.

(21) Appl. No.: 17/926,759

(22) PCT Filed: Apr. 29, 2021

(86) PCT No.: PCT/CN2021/091201
§ 371 (c)(1),
(2) Date: Nov. 21, 2022

(87) PCT Pub. No.: WO2021/238575
PCT Pub. Date: Dec. 2, 2021

(65) Prior Publication Data
US 2023/0189367 A1 Jun. 15, 2023

(30) Foreign Application Priority Data
May 29, 2020 (CN) .......................... 202010477382.2

(51) Int. Cl.
H04W 76/16 (2018.01)
H04W 88/10 (2009.01)

(52) U.S. Cl.
CPC ............ H04W 76/16 (2018.02); H04W 88/10 (2013.01)

(58) Field of Classification Search
CPC .............................. H04W 76/16; H04W 88/10
See application file for complete search history.

(56) References Cited

U.S. PATENT DOCUMENTS 6,762,992 B1    7/2004  Lemieux
2017/0318505 A1  11/2017  Park et al.
(Continued)

FOREIGN PATENT DOCUMENTS

CN     105934980     9/2016
CN     108668381    10/2018
(Continued)

OTHER PUBLICATIONS

Extended European Search Report issued on Aug. 16, 2023 in corresponding European Patent Application No. 21813537.4; 9 pages.
(Continued)

Primary Examiner — Michael T Vu
(74) Attorney, Agent, or Firm — Andrew M. Calderon; Calderon Safran & Wright P.C.

(57) ABSTRACT

Provided are a method for establishing multiple connections, and a network device and a system, which relate to the field of mobile communications. The method comprises: a first-mode network device receiving a connection request sent by a terminal of a user; according to the priority of the user, selecting a combination, the level of which corresponds to the priority of the user, of a connection policy of a first-mode network and a connection policy of a second-mode network; establishing at least one first-mode network connection with the terminal according to the connection policy of the first-mode network; and notifying a second-mode network device of information of the connection policy of the second-mode network, such that the second-mode network device establishes at least one second-mode network con-
(Continued)

nection with the terminal according to the connection policy of the second-mode network.

20 Claims, 4 Drawing Sheets

(56) References Cited

U.S. PATENT DOCUMENTS

| | | | |
|---|---|---|---|
| 2018/0049083 A1* | 2/2018 | Kubota | H04W 72/1268 |
| 2020/0045762 A1 | 2/2020 | Raghuram et al. | |
| 2021/0084524 A1* | 3/2021 | Foti | H04W 28/24 |
| 2024/0121842 A1* | 4/2024 | Sanchez Vega | H04L 45/24 |

FOREIGN PATENT DOCUMENTS

| | | |
|---|---|---|
| CN | 109587701 A | 4/2019 |
| CN | 109788577 | 5/2019 |
| CN | 111148183 A | 5/2020 |
| CN | 111163474 A | 5/2020 |
| WO | 2019/186235 | 10/2019 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 16)", 3GPP Draft; 36331-G00, 3rd Generation Partnership Project (3GPP), Mobile Competence Centre; 650, Route Des Lucioles; F-06921 Sophia-Antipolis Cedex; France, Apr. 6, 2020 (Apr. 6, 2020), XP052353365; 1197 pages.

"3rd Generation Partnership Project; Technical Specification Group Radio Access Network; Evolved Universal Terrestrial Radio Access (E-UTRA) and NR; Multi-connectivity; Stage 2 (Release 16)", 3GPP Draft; 37340-G10,3rd Generation Partnership Project (3GPP), Mobile Competence Centre ; 650, Route Des Lucioles ; F-06921 Sophia-Antipolis Cedex ; France, Apr. 7, 2020 (Apr. 7, 2020), XP052353368; 74 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)",3GPP Standard; Technical Specification; 3GPP TS 36.300, 3rd Generation Partnership Project (3GPP), vol. RAN WG2, No. V16.1.0 Apr. 14, 2020 (Apr. 14, 2020), pp. 1-386, XP051893975; 386 pages.

"3rd Generation Partnership Project; Technical Specification Group Radio Access Network; Study on new radio access technology: Radio access architecture and interfaces (Release 14)", 3GPP Standard; Technical Report; 3GPP TR 38.801, 3rd Generation Partnership Project (3GPP), Mobile Competence Centre ; 650, Route Des Lucioles; F-06921 Sophia-Antipolis Cedex; France, vol. RAN WG3, No. V14.0.0, Apr. 3, 2017 (Apr. 3, 2017), pp. 1-91, XP051298041; 91 pages.

Oppo, "Discussion on CellBarred IE in NR SIB1", 3GPP TSG-RAN WG2#101 R2-1801788 Revision of R2-1800052, Athens, Greece, Feb. 26-Mar. 2, 2018, 3 Pages.

Panasonic, "On inter UE Tx prioritization/multiplexing enhancements for NR URLLC", 3GPP TSG RAN WG1 #96bis R1-1904189, Xi'an, China, Apr. 8-12, 2019, 6 Pages.

Japanese Office Action dated May 17, 2024 in JP Application No. 2022-573469, with English Translation, 6 pages.

International Search Report issued on Jul. 27, 2021 in corresponding Application No. PCT/CN2021/091201; 8 pages.

International Preliminary Report on Patentability issued on Nov. 17, 2022 in corresponding Application No. PCT/CN2021/091201; 9 pages.

Notification to Grant Patent Right for Invention dated Jan. 29, 2024 in related Chinese Application No. 202010477382.2 and it's English Translation, 7 pages.

* cited by examiner

METHOD FOR ESTABLISHING MULTIPLE CONNECTIONS, AND NETWORK DEVICE AND SYSTEM

CROSS-REFERENCE TO RELATED APPLICATIONS

This application is a U.S. National Stage Application under 35 U.S.C. § 371 of International Patent Application No. PCT/CN2021/091201, filed on Apr. 29, 2021, which is based on and claims the priority of the Chinese patent application No. 202010477382.2 filed on May 29, 2020, the disclosure of both of which are hereby incorporated in its entirety into the present application.

TECHNICAL FIELD

This disclosure relates to the field of mobile communications, and particularly to a method, network device, and system for establishing multiple connections.

BACKGROUND

Currently there are mobile networks of various modes, for example, the fifth generation (5G, $5^{th}$ Generation) mobile network, the fourth generation (4G, $4^{th}$ Generation) mobile network, the third generation (3G, $3^{th}$ Generation) mobile network, and the like. In a mobile network environment where mobile networks of different modes coexist, by use of multiple connections technology, a terminal of a user can simultaneously aggregate the mobile networks of the different modes to improve the transmission rate, thereby improving service experience of the user in the multiple connections network.

Inventors have found that, a mobile network of each mode can be deployed in a plurality of frequency point systems, for example, the 4G mobile network can be deployed in a plurality of frequency point systems including 800 MHz, 1.8 GHz, 2.1 GHz, and the like, and the 5G mobile network can also be deployed in a plurality of frequency point systems including 2.1 GHz, 3.5 GHz, 4.9 GHz, and the like. A coverage performance and capacity performance of each frequency point system will be different, so how to establish multiple connections to realize a differentiated shared network service has become a problem to be solved.

SUMMARY

According to some embodiments of the present disclosure, there is provided a method for establishing multiple connections, comprising:
  a first-mode network device receiving a connection request sent by a terminal of a user;
  the first-mode network device, according to a priority of the user, selecting a combination of a connection policy of a first-mode network and a connection policy of a second-mode network that is at a level corresponding to the priority of the user;
  the first-mode network device establishing at least one first-mode network connection with the terminal of the user according to the connection policy of the first-mode network; and
  the first-mode network device notifying a second-mode network device of information of the connection policy of the second-mode network, so that the second-mode network device establishes at least one second-mode network connection with the terminal of the user according to the connection policy of the second-mode network.

In some embodiments, the first-mode network device selecting a combination of a connection policy of a first-mode network and a connection policy of a second-mode network, the level of which corresponds to the priority of the user comprises:
  the first-mode network device, according to the priority of the user and an operator to which the user belongs, selecting the combination of the connection policy of the first-mode network and the connection policy of the second-mode network that is at the level corresponding to the priority of the user and matched with the operator to which the user belongs,
  wherein in the case that the user belongs to a contractor operator, the selected connection policy of the first-mode network comprises a control plane connection policy and a user plane connection policy of the first-mode network, and the selected connection policy of the second-mode network comprises a user plane connection policy of the second-mode network; or
  in the case that the user belongs to a shared operator, the selected connection policy of the first-mode network comprises a control plane connection policy of the first-mode network, and the selected connection policy of the second-mode network comprises a user plane connection policy of the second-mode network.

In some embodiments, the establishing at least one first-mode network connection and the establishing at least one second-mode network connection comprises:
  in the case that the user belongs to the contractor operator, the second-mode network device establishing at least one user plane connection of the second-mode network with the terminal of the user according to the user plane connection policy of the second-mode network, the first-mode network device establishing at least one control plane connection and at least one user plane connection of the first-mode network with the terminal of the user according to the control plane connection policy and the user plane connection policy of the first-mode network, and turning on a shunt switch for shunting user plane data from the at least one user plane connection of the second-mode network to the at least one user plane connection of the first-mode network, so that the user plane data of the user is transmitted in the at least one user plane connection of the first-mode network and the at least one user plane connection of the second-mode network.

In some embodiments, the establishing at least one first-mode network connection and the establishing at least one second-mode network connection comprises:
  in the case that the user belongs to the shared operator, the second-mode network device establishing at least one user plane connection of the second-mode network with the terminal of the user according to the user plane connection policy of the second-mode network, the first-mode network device establishing at least one control plane connection of the first-mode network with the terminal of the user according to the control plane connection policy of the first-mode network, and turning off a shunt switch for shunting user plane data from the second-mode network to the first-mode network, so that the user plane data of the user is transmitted in the at least one user plane connection of the second-mode network.

In some embodiments, the first-mode network device determines that the operator to which the user belongs is the contractor operator or the shared operator according to a public land mobile network (PLMN) number sent by the terminal of the user.

In some embodiments, the first-mode network device selecting a combination of a connection policy of a first-mode network and a connection policy of a second-mode network that is at a level corresponding to the priority of the user comprises:

the first-mode network device selecting a combination of a connection policy of a first-mode network and a connection policy of a second-mode network that is at a level corresponding to the priority of the user from frequency points that can be measured by the terminal of the user;

the connection policy of the first-mode network comprising at least one connection configuration of the first-mode network, each connection configuration of the first-mode network comprising frequency point information and bandwidth information of one first-mode network connection; or the connection policy of the second-mode network comprising at least one connection configuration of the second-mode network, each connection configuration of the second-mode network comprising frequency point information and bandwidth information of one second-mode network connection.

In some embodiments, the first-mode network device selecting a combination of a connection policy of a first-mode network and a connection policy of a second-mode network that is at a level corresponding to the priority of the user comprises:

the first-mode network device, according to the priority of the user and the operator to which the user belongs, selecting the combination of the connection policy of the first-mode network and the connection policy of the second-mode network that is at the level corresponding to the priority of the user and matched with the operator to which the user belongs from the frequency points that can be measured by the terminal of the user;

the connection policy of the first-mode network comprising at least one connection configuration of the first-mode network, each connection configuration of the first-mode network comprising frequency point information and bandwidth information of one first-mode network connection; or the connection policy of the second-mode network comprising at least one connection configuration of the second-mode network, each connection configuration of the second-mode network comprising frequency point information and bandwidth information of one second-mode network connection.

In some embodiments, the higher the priority of the user, the better performance of the selected combination, wherein the performance comprises at least one of a coverage performance or a capacity performance.

In some embodiments, a frequency point of the control plane connection in the control plane connection policy of the first-mode network is less than a frequency point of the user plane connection in the user plane connection policy of the second-mode network.

In some embodiments, the first-mode network device is a base station of fourth generation mobile communication or a base station of third generation mobile communication; the second-mode network device is a base station of fifth generation mobile communication.

According to some embodiments of the present disclosure, there is provided a first-mode network device, comprising: a memory; and a processor coupled to the memory and configured to perform the method for establishing multiple connections according to any of the embodiments based on instructions stored in the memory.

According to some embodiments of the present disclosure, there is provided a system for establishing multiple connections, comprising: the first-mode network device according to any of the embodiments; and a second-mode network device configured to receive information of the connection policy of the second-mode network that is notified by the first-mode network device, and establish at least one second-mode network connection with the terminal of the user according to the connection policy of the second-mode network.

According to some embodiments of the present disclosure, there is provided a non-transitory computer-readable storage medium stored a computer program which implements the steps of the method for establishing multiple connections according to any of the embodiments when executed by a processor.

BRIEF DESCRIPTION OF THE DRAWINGS

The accompanying drawings that need to be used in the description of the embodiments or the related art will be briefly described below. The present disclosure will be more clearly understood from the following detailed description, which proceeds with reference to the accompanying drawings.

It should be apparent that the drawings in the following description are merely some embodiments of the present disclosure and that other drawings can also be derived by those of ordinary skill in the art without paying out creative efforts.

DETAILED DESCRIPTION

The technical solutions in the embodiments of the present disclosure will be clearly and completely described below in conjunction with the drawings in the embodiments of the present disclosure.

Unless specifically stated otherwise, descriptions such as "first", "second", and the like, in the present disclosure are used for distinguishing different objects, and are not intended to express size, sequence, or the like.

According to the present disclosure, in a multi-mode network formed by a first-mode network and a second-mode network, a first-mode network device is taken as a control point (or anchor point) and is combined with a second-mode network device to establish hierarchical multiple connections according to different priorities of users, thereby realizing a differentiated shared network service.

Figure 1:
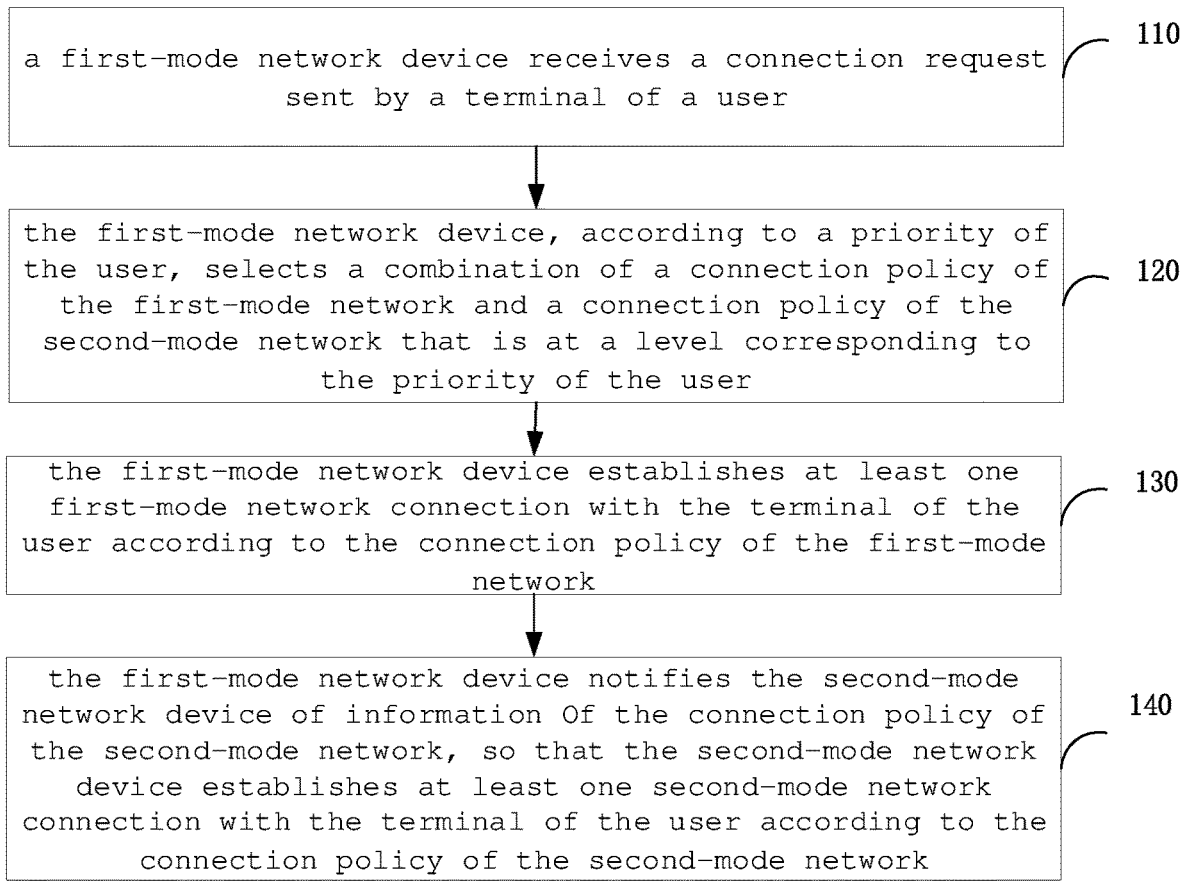
FIG. 1 illustrates a schematic flow diagram of a method for establishing hierarchical multiple connections according to some embodiments of the present disclosure.

FIG. 1 illustrates a schematic flow diagram of a method for establishing hierarchical multiple connections according to some embodiments of the present disclosure.

As shown in FIG. 1, the method of this embodiment comprises: steps 110-140.

In the step 110, in a multi-mode network formed by a first-mode network and a second-mode network, a first-mode network device receives a connection request sent by a terminal of a user.

The user herein can be a user of a contractor operator or a user of a shared operator.

The first-mode network is, for example, the fourth generation mobile network or the third generation mobile network, and the second-mode network is, for example, the fifth generation mobile network; and accordingly, the first-mode network device is, for example, a base station of the fourth generation mobile communication (a 4G base station for short) or a base station of the third generation mobile communication (a 3G base station for short), and the second-mode network device is, for example, a base station of the fifth generation mobile communication (a 5G base station for short), but is not limited to the examples.

In the step 120, the first-mode network device, according to a priority of the user, selects a combination of a connection policy of the first-mode network and a connection policy of the second-mode network that is at a level corresponding to the priority of the user.

The first-mode network device can preset combinations of the connection policy of the first-mode network and the connection policy of the second-mode network that are at different levels, and then select the combination of the connection policy of the first-mode network and the connection policy of the second-mode network that is at the level corresponding to the priority of the user. The higher the priority of the user, the better the performance of the selected combination, wherein the performance comprises a coverage performance, capacity performance, or other performances.

It is assumed that: the order of the coverage performance from good to poor is first-mode network connections 1, 2, 3, and the order of the capacity performance from large to small is second-mode network connections 1, 2, 3. The combination of the connection policy of the first-mode network and the connection policy of the second-mode network that is at the corresponding level is selected according to the priority of a sharing policy signed by the user. For example, if a priority of a user A is higher, a combination of the first-mode network connection 1 and the second-mode network connection 1 can be selected, and if a priority of a user B is lower, a combination of the first-mode network connection 2 and the second-mode network connection 3 can be selected. But it is not limited to the examples given.

It is assumed that: a coverage performance of the first-mode network is better than that of the second-mode network, a data transmission performance of the second-mode network is better than that of the first-mode network, the first-mode network device can be taken as a control point (or anchor point) of multiple connections network, the connection policy of the first-mode network can be deployed as a control plane connection of the first-mode network to ensure that the user can normally access the network; on the basis, a user plane connection of the first-mode network can be further deployed for a specific user such as a user of a contractor operator, and the connection policy of the second-mode network can be deployed as a data plane connection (i.e. user plane connection) of the second-mode network. A frequency point of the control plane connection in the control plane connection policy of the first-mode network is less than a frequency point of the user plane connection in the user plane connection policy of the second-mode network. Therefore, through the multiple connections technology, the performance advantages of the mobile networks of different modes are aggregated to serve the user, and the user can not only enjoy the good coverage performance of the first-mode network, but also enjoy the good data transmission performance of the second-mode network, thereby improving the service experience of the user.

The connection policy of the first-mode network comprises at least one connection configuration of the first-mode network, each connection configuration of the first-mode network comprising frequency point information and bandwidth information of one first-mode network connection.

The connection policy of the second-mode network comprises at least one connection configuration of the second-mode network, each connection configuration of the second-mode network comprising frequency point information and bandwidth information of one second-mode network connection.

In some embodiments, the terminal of the user reports information of frequency points that can be measured thereby to the first-mode network device, and the first-mode network device selects, from the frequency points that can be measured by the terminal of the user, the combination of the connection policy of the first-mode network and the connection policy of the second-mode network that is at the level corresponding to the priority of the user. Therefore, an effective combination of connection policies is selected for the user in conjunction with the frequency points that can be measured by the terminal and the capability of the terminal for connecting multiple frequency points simultaneously.

For example, if there is no frequency point of the first-mode network connection 1 in frequency points that can be measured by the user A with a higher priority, the combination of the first-mode network connection 1 and the second-mode network connection 1 cannot be allocated to the user A although it has a higher performance level, and if the frequency points that can be measured by the user A include a frequency point of the first-mode network connection 2 and a frequency point of the second-mode network connection 1, a suboptimal combination of the first-mode network connection 2 and the second-mode network connection 1 can be allocated to the user A.

In some embodiments, the first-mode network device, according to the priority of the user and an operator to which the user belongs, selects the combination of the connection policy of the first-mode network and the connection policy of the second-mode network that is at the level corresponding to the priority of the user and matched with the operator to which the user belongs. Therefore, different combinations of connection policies are selected for users of different operators, to provide differentiated shared network services for the users of the different operators.

In some embodiments, the first-mode network device selects, from the frequency points that can be measured by the terminal of the user and the capability of the terminal for connecting multiple frequency points simultaneously, according to the priority of the user and the operator to which the user belongs, the combination of the connection policy of the first-mode network and the connection policy of the second-mode network that is at the level corresponding to the priority of the user and matched with the operator to which the user belongs. Therefore, an effective combination of connection policies can not only be selected for the user, but also differentiated shared network services can be provided for the users of different operators.

The solution of selecting a combination of connection policies according to the operator to which the user belongs will be described in detail later in conjunction with the embodiment shown in FIG. 2.

In the step 130, the first-mode network device establishes at least one first-mode network connection with the terminal of the user according to the connection policy of the first-mode network.

If the connection policy of the first-mode network comprises one connection configuration of the first-mode network, the first-mode network device establishes one first-mode network connection with the terminal of the user according to the one connection configuration of the first-mode network.

If the connection policy of the first-mode network comprises a plurality of connection configurations of the first-mode networks, the first-mode network device establishes a plurality of first-mode network connections with the terminal of the user respectively according to the plurality of connection configurations of the first-mode networks.

In the step 140, the first-mode network device notifies the second-mode network device of information of the connection policy of the second-mode network, so that the second-mode network device establishes at least one second-mode network connection with the terminal of the user according to the connection policy of the second-mode network.

If the connection policy of the second-mode network comprises one connection configuration of the second-mode network, the second-mode network device establishes one second-mode network connection with the terminal of the user according to the one connection configuration of the second-mode network.

If the connection policy of the second-mode network comprises a plurality of connection configurations of the second-mode networks, the second-mode network device establishes a plurality of second-mode network connections with the terminal of the user respectively according to the plurality of connection configurations of the second-mode networks.

In the above embodiment, in the multi-mode network formed by the first-mode network and the second-mode network, the first-mode network device is taken as the control point (or anchor point) and is combined with the second-mode network device, to establish the hierarchical multiple connections according to different priorities of users, thereby realizing a differentiated shared network service.

Figure 2:
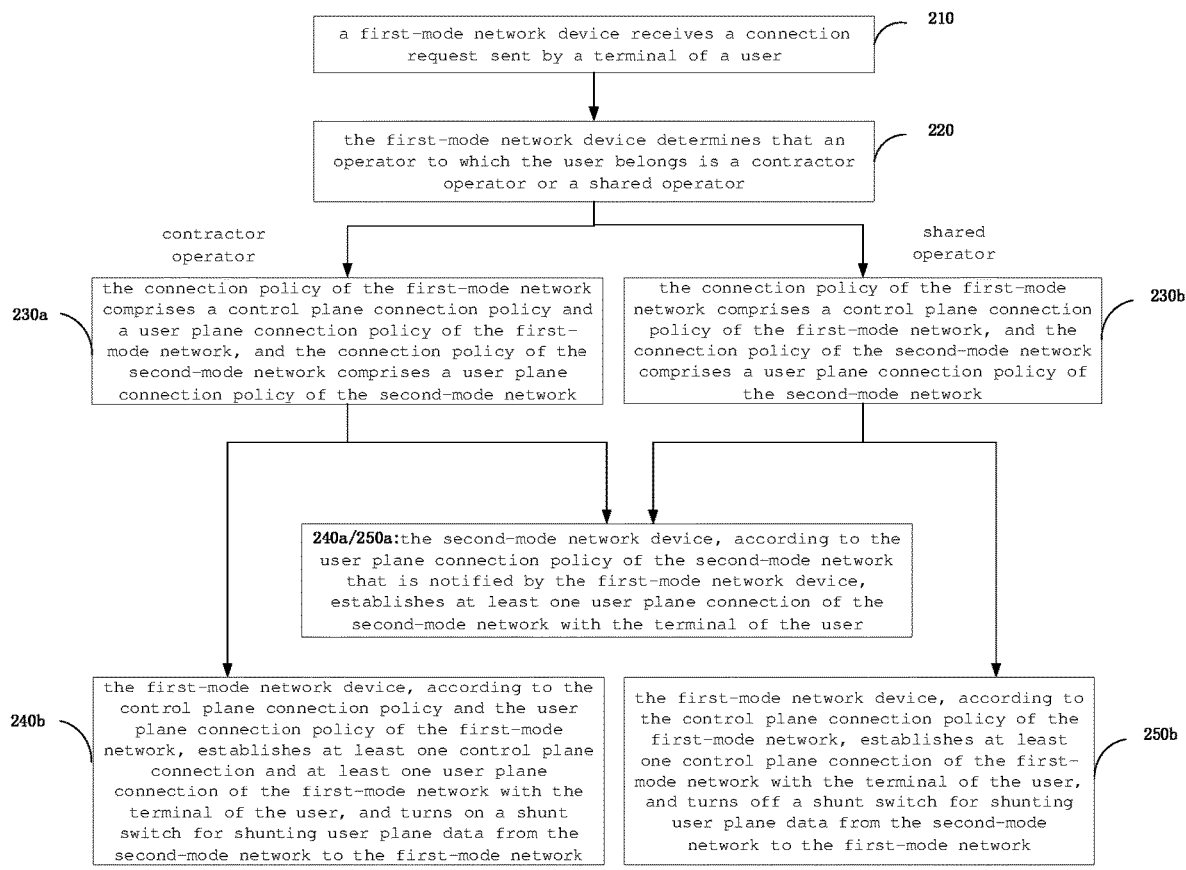
FIG. 2 illustrates a schematic flow diagram of a method for establishing hierarchical multiple connections according to other embodiments of the present disclosure.

FIG. 2 illustrates a schematic flow diagram of a method for establishing hierarchical multiple connections according to other embodiments of the present disclosure.

As shown in FIG. 2, the method of this embodiment comprises the following steps.

In step 210, in a multi-mode network formed by a first-mode network and a second-mode network, a first-mode network device receives a connection request sent by a terminal of a user.

In step 220, the first-mode network device determines that an operator to which the user belongs is a contractor operator or a shared operator, according to a public land mobile network (PLMN) number sent by the terminal of the user.

The PLMN number includes an MCC (Mobile Country Code) and an MNC (Mobile Network Code), and the operator to which the user belongs can be determined by the MNC.

The first-mode network device acquires the PLMN number, for example, from the connection request sent by the terminal of the user.

In step 230, the first-mode network device, according to the priority of the user and the operator to which the user belongs, selects a combination of a connection policy of the first-mode network and a connection policy of the second-mode network that is at a level corresponding to the priority of the user and matched with the operator to which the user belongs.

230a: in the case that the user belongs to the contractor operator, the selected connection policy of the first-mode network comprises a control plane connection policy and a user plane connection policy of the first-mode network, and the selected connection policy of the second-mode network comprises a user plane connection policy of the second-mode network.

230b: in the case that the user belongs to the shared operator, the selected connection policy of the first-mode network comprises a control plane connection policy of the first-mode network, and the selected connection policy of the second-mode network comprises a user plane connection policy of the second-mode network.

In step 240, in the case that the user belongs to the contractor operator, the second-mode network device, according to the user plane connection policy of the second-mode network that is notified by the first-mode network device, establishes at least one user plane connection of the second-mode network with the terminal of the user (step 240a), and the first-mode network device, according to the control plane connection policy and the user plane connection policy of the first-mode network, establishes at least one control plane connection and at least one user plane connection of the first-mode network with the terminal of the user, and turns on a shunt switch for shunting user plane data from the at least one user plane connection of the second-mode network to the at least one user plane connection of the first-mode network (step 240b), so that the user plane data of the user can be transmitted in the at least one user plane connection of the first system network and the at least one user plane connection of the second system network.

In step 250, in the case that the user belongs to the shared operator, the second-mode network device, according to the user plane connection policy of the second-mode network that is notified by the first-mode network device, establishes at least one user plane connection of the second-mode network with the terminal of the user (step 250a), and the first-mode network device, according to the control plane connection policy of the first-mode network, establishes at least one control plane connection of the first-mode network with the terminal of the user, and turns off a shunt switch for shunting user plane data from the second-mode network to the first-mode network (step 250b), so that the user plane data of the user can be transmitted in the at least one user plane connection of the second-mode network.

Therefore, different combinations of connection policies are selected for the users of the different operators, and differentiated shared network services are provided for the users of the different operators.

The multiple connections network comprises core network and access network, the access network generally adopting a network architecture in which a control plane and a user plane are separated. Taking NSA (Non-Standalone)

dual connection solution of a 5G mobile network as an example, since a deployed frequency point of a 4G base station is less than that of a 5G base station so that a coverage range of the 4G base station is larger than that of the 5G base station, in the NSA dual connection solution, the 4G base station is responsible for transmission of control plane signaling, and the 5G base station and the 4G base station are jointly responsible for transmission of user plane data through the dual connection technology, thereby achieving the purpose of aggregating performances of the 4G and 5G mobile networks. Protocol stacks of the 4G base station and the 5G base station comprise, for example, a PDCP (Packet Data Convergence Protocol) layer, a RLC (Radio Link Control) layer, a MAC (Media Access Control) layer, a PHY (Physical) layer, and the like. The 4G base station and the 5G base station are both connected to an EPC (Evolved Packet Core). The 4G base station is, for example, a LTE (Long Term Evolution) base station, and the 5G base station is, for example, a NR (New Radio) base station.

It is assumed that the order of a coverage performance from good to poor is control plane connections 1, 2, 3 of the first-mode network, the order of a capacity performance from large to small is user plane connections 1, 2, 3 of the first-mode network, and the order of a capacity performance from large to small is user plane connections 1, 2, 3 of the second-mode network. The combination of the connection policy of the first-mode network and the connection policy of the second-mode network that is at the corresponding level is selected according to the priority of a sharing policy signed by the user.

Figure 3A:
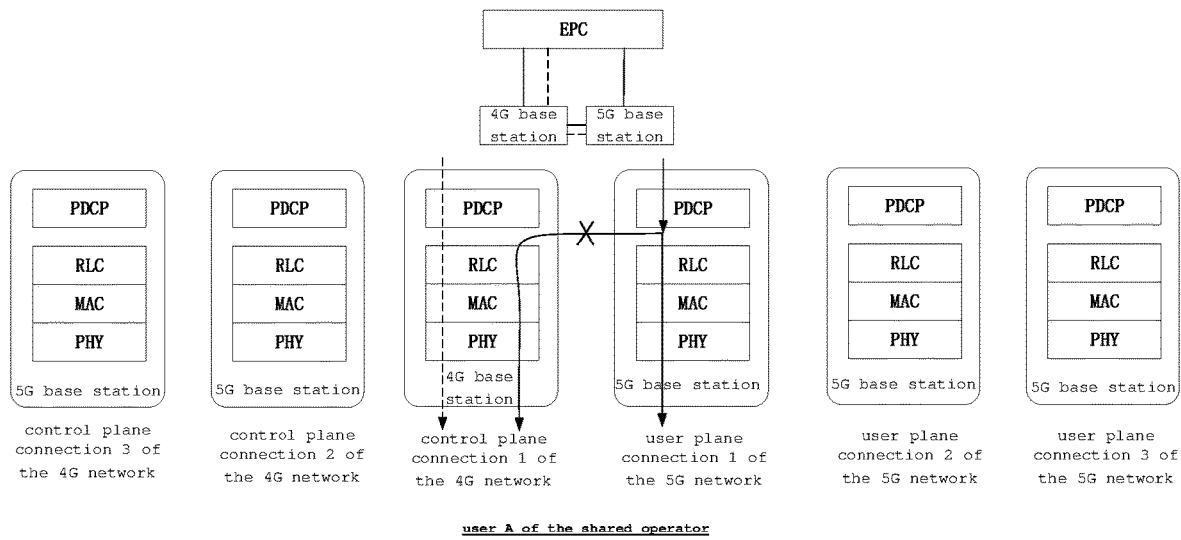
FIG. 3A illustrates a schematic diagram of information transmission when a shunt switch is turned off according to other embodiments of the present disclosure.

As shown in FIG. 3A, if a user A is a user of the shared operator and a priority of the user A is higher, a shunt switch for shunting user plane data from the second-mode network (e.g., 5G network) to the first-mode network (e.g., 4G network) is turned off, so that a combination of the control plane connection 1 of the first-mode network and the user plane connection 1 of the second-mode network can be selected, wherein control plane signaling is transmitted through the control plane connection 1 of the first-mode network, and the user plane data is transmitted only through the user plane connection 1 of the second-mode network. The transmission of the control plane signaling is shown by a dashed arrow and the transmission of the user plane data is shown by a solid arrow.

Figure 3B:
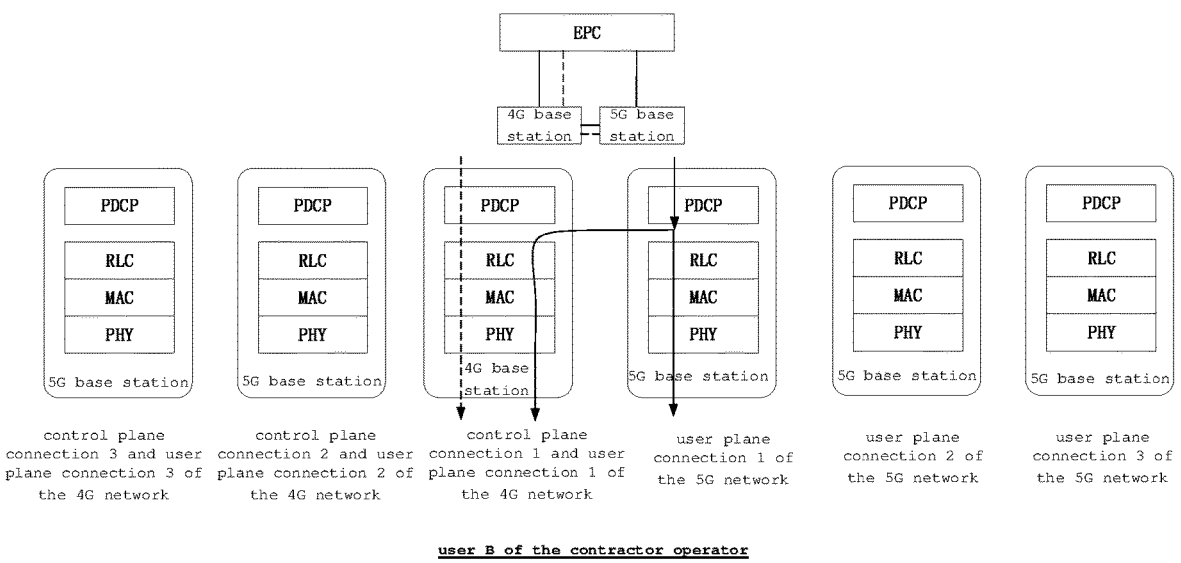
FIG. 3B illustrates a schematic diagram of information transmission when a shunt switch is turned on according to other embodiments of the present disclosure.

As shown in FIG. 3B, if a user B is a user of the contractor operator and a priority of the user B is higher, a shunt switch for shunting user plane data from the second-mode network (e.g., 5G network) to the first-mode network (e.g., 4G network) is turned on, so that a combination of the control plane connection 1 and the user plane connection 1 of the first-mode network and the user plane connection 1 of the second-mode network can be selected, wherein control plane signaling is transmitted through the control plane connection 1 of the first-mode network, and the user plane data is transmitted through the user plane connection 1 of the first-mode network and the user plane connection 1 of the second-mode network at the same time. The transmission of the control plane signaling is shown by a dashed arrow and the transmission of the user plane data is shown by a solid arrow.

Figure 4:
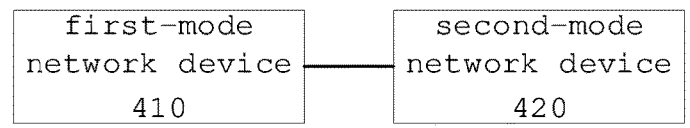
FIG. 4 illustrates a schematic diagram of a system for establishing hierarchical multiple connections according to some embodiments of the present disclosure.

FIG. 4 illustrates a schematic diagram of a system for establishing hierarchical multiple connections according to some embodiments of the present disclosure.

As shown in FIG. 4, the system 400 of this embodiment comprises: a first-mode network device 410 and a second-mode network device 420.

The first-mode network device 410 is configured to perform the method for establishing hierarchical multiple connections according to any of the embodiments. For example, a connection request sent by a terminal of a user is received; a combination of a connection policy of a first-mode network and a connection policy of a second-mode network that is at a level corresponding to a priority of the user is selected according to the priority of the user; at least one first-mode network connection with the terminal of the user is established according to the connection policy of the first-mode network; and the second-mode network device is notified of information of the connection policy of the second-mode network, so that the second-mode network device establishes at least one second-mode network connection with the terminal of the user according to the connection policy of the second-mode network. For more methods for establishing hierarchical multiple connections, reference is made to the foregoing description, which will not be repeated here.

The second-mode network device 420 is configured to receive the information of the connection policy of the second-mode network that is notified by the first-mode network device, and establish at least one second-mode network connection with the terminal of the user according to the connection policy of the second-mode network.

In some embodiments, the first-mode network device 410 is configured to, according to the priority of the user and an operator to which the user belongs, select the combination of the connection policy of the first-mode network and the connection policy of the second-mode network that is at the level corresponding to the priority of the user and matched with the operator to which the user belongs, wherein in the case that the user belongs to a contractor operator, the selected connection policy of the first-mode network comprises a control plane connection policy and a user plane connection policy of the first-mode network, and the selected connection policy of the second-mode network comprises a user plane connection policy of the second-mode network; and in the case that the user belongs to a shared operator, the selected connection policy of the first-mode network comprises a control plane connection policy of the first-mode network, and the selected connection policy of the second-mode network comprises a user plane connection policy of the second-mode network.

In the case that the user belongs to the contractor operator, the second-mode network device 420 is configured to, according to the user plane connection policy of the second-mode network, establish at least one user plane connection of the second-mode network with the terminal of the user, and the first-mode network device 410 is configured to, according to the control plane connection policy and the user plane connection policy of the first-mode network, establish at least one control plane connection and at least one user plane connection of the first-mode network with the terminal of the user, and turn on a shunt switch for shunting user plane data from the at least one user plane connection of the second-mode network to the at least one user plane connection of the first-mode network, so that the user plane data of the user is transmitted in the at least one user plane connection of the first-mode network and the at least one user plane connection of the second-mode network.

In the case that the user belongs to the shared operator, the second-mode network device 420 is configured to, according to the user plane connection policy of the second-mode network, establish at least one user plane connection of the second-mode network with the terminal of the user, and the first-mode network device 410 is configured to, according to the control plane connection policy of the first-mode network, establish at least one control plane connection of the first-mode network with the terminal of the user, and turn off a shunt switch for shunting user plane data from the second-mode network to the first-mode network, so that the user plane data of the user is transmitted in the at least one user plane connection of the second-mode network.

In some embodiments, the first-mode network device 410 is configured to, from frequency points that can be measured by the terminal of the user, select a combination of a connection policy of the first-mode network and a connection policy of the second-mode network that is at the level corresponding to the priority of the user, wherein the connection policy of the first-mode network comprises at least one connection configuration of the first-mode network, each connection configuration of the first-mode network comprising frequency point information and bandwidth information of one first-mode network connection; and the connection policy of the second-mode network comprises at least one connection configuration of the second-mode network, each connection configuration of the second-mode network comprising frequency point information and bandwidth information of one second-mode network connection.

In some embodiments, the first-mode network device 410 is configured to, from the frequency points that can be measured by the terminal of the user, according to the priority of the user and the operator to which the user belongs, select a combination of a connection policy of the first-mode network and a connection policy of the second-mode network that is at the level corresponding to the priority of the user and matched with the operator to which the user belongs, wherein the connection policy of the first-mode network comprises at least one connection configuration of the first-mode network, each connection configuration of the first-mode network comprising frequency point information and bandwidth information of one first-mode network connection; and the connection policy of the second-mode network comprises at least one connection configuration of the second-mode network, each connection configuration of the second-mode network comprising frequency point information and bandwidth information of one second-mode network connection.

Figure 5:
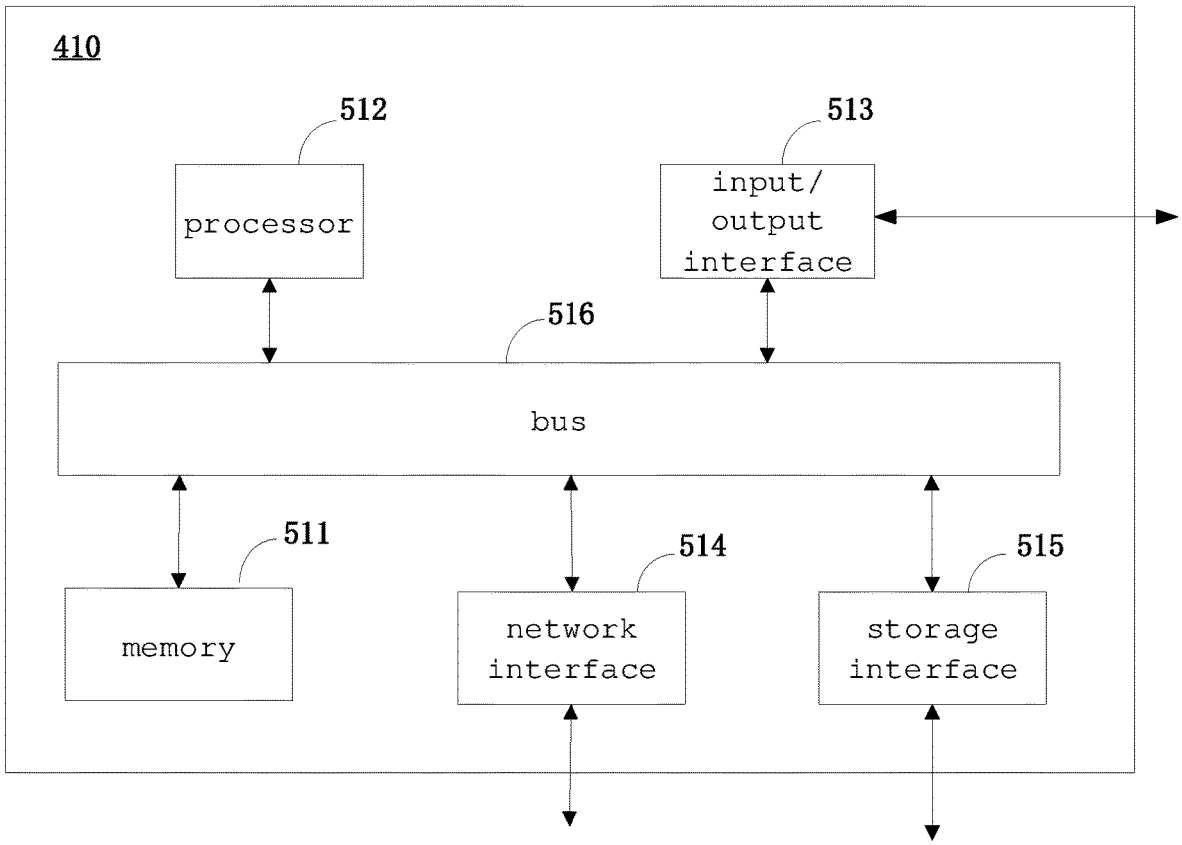
FIG. 5 illustrates a schematic diagram of a first-mode network device according to some embodiments of the present disclosure.

FIG. 5 illustrates a schematic diagram of a first-mode network device according to some embodiments of the present disclosure.

As shown in FIG. 5, the first-mode network device 410 of this embodiment comprises: a memory 511; and a processor 512 coupled to the memory 511. The processor 512 is configured to perform the method for establishing hierarchical multiple connections according to any of the embodiments based on instructions stored in the memory.

For example, the processor 512 is configured to receive a connection request sent by a terminal of a user; according to a priority of the user, select a combination of a connection policy of a first-mode network and a connection policy of a second-mode network that is at a level corresponding to the priority of the user; according to the connection policy of the first-mode network, establish at least one first-mode network connection with the terminal of the user; and notify a second-mode network device of information of the connection policy of the second-mode network, so that the second-mode network device establishes at least one second-mode network connection with the terminal of the user according to the connection policy of the second-mode network. For more methods for establishing hierarchical multiple connections, reference is made to the foregoing description, which will not be repeated here.

For another example, the processor 512 is configured to, according to the priority of the user and an operator to which the user belongs, select the combination of the connection policy of the first-mode network and the connection policy of the second-mode network that is at the level corresponding to the priority of the user and matched with the operator to which the user belongs, wherein in the case that the user belongs to a contractor operator, the selected connection policy of the first-mode network comprises a control plane connection policy and a user plane connection policy of the first-mode network, and the selected connection policy of the second-mode network comprises a user plane connection policy of the second-mode network; and in the case that the user belongs to a shared operator, the selected connection policy of the first-mode network comprises a control plane connection policy of the first-mode network, and the selected connection policy of the second-mode network comprises a user plane connection policy of the second-mode network.

For another example, the processor 512 is configured to, from frequency points that can be measured by the terminal of the user, select the combination of the connection policy of the first-mode network and the connection policy of the second-mode network that is at the level corresponding to the priority of the user, wherein the connection policy of the first-mode network comprises at least one connection configuration of the first-mode network, each connection configuration of the first-mode network comprising frequency point information and bandwidth information of one first-mode network connection; and the connection policy of the second-mode network comprises at least one connection configuration of the second-mode network, each connection configuration of the second-mode network comprising frequency point information and bandwidth information of one second-mode network connection.

For another example, the processor 512 is configured to, from the frequency points that can be measured by the terminal of the user, according to the priority of the user and the operator to which the user belongs, select the combination of the connection policy of the first-mode network and the connection policy of the second-mode network that is at the level corresponding to the priority of the user and matched with the operator to which the user belongs, wherein the connection policy of the first-mode network comprises at least one connection configuration of the first-mode network, each connection configuration of the first-mode network comprising frequency point information and bandwidth information of one first-mode network connection; and the connection policy of the second-mode network comprises at least one connection configuration of the second-mode network, each connection configuration of the second-mode network comprising frequency point information and bandwidth information of one second-mode network connection.

The memory 511 can include, for example, a system memory, a fixed nonvolatile storage medium, and the like. The system memory stores, for example, an operating system, application, boot loader, other programs, and the like.

The first-mode network device 410 can further comprise an input/output interface 513, a network interface 514, a storage interface 515, and the like. These interfaces 513, 514, 515 as well as the memory 511 and the processor 512 can be connected, for example, by a bus 516. The input/output interface 513 provides a connection interface for input/output devices such as a display, a mouse, a keyboard, and a touch screen. The network interface 514 provides a connection interface for various networking devices. The storage interface 515 provides a connection interface for external storage devices such as a SD card and a USB disk.

The present disclosure provides a non-transitory computer-readable storage medium stored a computer program which implements the steps of the method for establishing hierarchical multiple connections according to any of the embodiments when executed by a processor.

It should be appreciated by those skilled in the art that, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more non-transitory computer-readable storage media (including, but not limited to, a disk memory, CD-ROM, optical memory, etc.) having computer program code embodied therein.

The present disclosure is described with reference to flow diagrams and/or block diagrams of the method, device (system), and computer program product according to the embodiments of the present disclosure. It should be understood that each flow and/or block in the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing the functions specified in one or more flows of the flow diagrams and/or one or more blocks of the block diagrams.

These computer program instructions can also be stored in a computer-readable memory that can guide a computer or other programmable data processing devices to function in a specific manner, such that the instructions stored in the computer-readable memory produce an article of manufacture including instruction means which implement the functions specified in one or more flows of the flow diagrams and/or one or more blocks of the block diagrams.

These computer program instructions can also be loaded onto a computer or other programmable data processing devices so that a series of operation steps are performed on the computer or other programmable devices to produce a computer-implemented process, and therefore, the instructions executed on the computer or other programmable devices provide steps for implementing the functions specified in one or more flows of the flow diagrams and/or one or more blocks of the block diagrams.

The above description is merely the preferred embodiments of the present disclosure and is not used for limiting the present disclosure, and any modifications, equivalents, improvements and the like that are made within the spirit and principle of the present disclosure should be included in the protection scope of the present disclosure.

What is claimed is:

1. A method for establishing multiple connections, comprising:
    a first-mode network device receiving a connection request sent by a terminal of a user;
    the first-mode network device, according to a priority of the user, selecting a combination of a connection policy of a first-mode network and a connection policy of a second-mode network that is at a level corresponding to the priority of the user, wherein in the case that the user belongs to a contractor operator, the selected connection policy of the first-mode network comprises a control plane connection policy and a user plane connection policy of the first-mode network, and the selected connection policy of the second-mode network comprises a user plane connection policy of the second-mode network; or in the case that the user belongs to a shared operator, the selected connection policy of the first-mode network comprises a control plane connection policy of the first-mode network, and the selected connection policy of the second-mode network comprises a user plane connection policy of the second-mode network;
    the first-mode network device establishing at least one first-mode network connection with the terminal of the user according to the connection policy of the first-mode network; and
    the first-mode network device notifying a second-mode network device of information of the connection policy of the second-mode network, so that the second-mode network device establishes at least one second-mode network connection with the terminal of the user according to the connection policy of the second-mode network.

2. The method according to claim 1, wherein the first-mode network device selecting a combination of a connection policy of a first-mode network and a connection policy of a second-mode network, the level of which corresponds to the priority of the user comprises:
    the first-mode network device, according to the priority of the user and an operator to which the user belongs, selecting the combination of the connection policy of the first-mode network and the connection policy of the second-mode network that is at the level corresponding to the priority of the user and matched with the operator to which the user belongs.

3. The method according to claim 2, wherein the establishing at least one first-mode network connection and the establishing at least one second-mode network connection comprises:
    in the case that the user belongs to the contractor operator, the second-mode network device establishing at least one user plane connection of the second-mode network with the terminal of the user according to the user plane connection policy of the second-mode network, the first-mode network device establishing at least one control plane connection and at least one user plane connection of the first-mode network with the terminal of the user according to the control plane connection policy and the user plane connection policy of the first-mode network, and turning on a shunt switch for shunting user plane data from the at least one user plane connection of the second-mode network to the at least one user plane connection of the first-mode network, so that the user plane data of the user is transmitted in the at least one user plane connection of the first-mode network and the at least one user plane connection of the second-mode network.

4. The method according to claim 2, wherein the establishing at least one first-mode network connection and the establishing at least one second-mode network connection comprises: in the case that the user belongs to the shared operator, the second-mode network device establishing at least one user plane connection of the second-mode network with the terminal of the user according to the user plane connection policy of the second-mode network, the first-mode network device establishing at least one control plane connection of the first-mode network with the terminal of the user according to the control plane connection policy of the first-mode network, and turning off a shunt switch for shunting user plane data from the second-mode network to the first-mode network, so that the user plane data of the user is transmitted in the at least one user plane connection of the second-mode network.

5. The method according to claim 2, further comprising:
the first-mode network device determining that the operator to which the user belongs is the contractor operator or the shared operator according to a public land mobile network (PLMN) number sent by the terminal of the user.

6. The method according to claim 1, wherein the first-mode network device selecting a combination of a connection policy of a first-mode network and a connection policy of a second-mode network that is at a level corresponding to the priority of the user comprises:
the first-mode network device selecting a combination of a connection policy of a first-mode network and a connection policy of a second-mode network that is at a level corresponding to the priority of the user from frequency points that can be measured by the terminal of the user;
the connection policy of the first-mode network comprising at least one connection configuration of the first-mode network, each connection configuration of the first-mode network comprising frequency point information and bandwidth information of one first-mode network connection; or
the connection policy of the second-mode network comprising at least one connection configuration of the second-mode network, each connection configuration of the second-mode network comprising frequency point information and bandwidth information of one second-mode network connection.

7. The method according to claim 2, wherein the first-mode network device selecting a combination of a connection policy of a first-mode network and a connection policy of a second-mode network that is at a level corresponding to the priority of the user comprises:
the first-mode network device, according to the priority of the user and the operator to which the user belongs, selecting the combination of the connection policy of the first-mode network and the connection policy of the second-mode network that is at the level corresponding to the priority of the user and matched with the operator to which the user belongs from the frequency points that can be measured by the terminal of the user;
the connection policy of the first-mode network comprising at least one connection configuration of the first-mode network, each connection configuration of the first-mode network comprising frequency point information and bandwidth information of one first-mode network connection; or
the connection policy of the second-mode network comprising at least one connection configuration of the second-mode network, each connection configuration of the second-mode network comprising frequency point information and bandwidth information of one second-mode network connection.

8. The method according to claim 1, wherein the higher the priority of the user, the better performance of the selected combination,
wherein the performance comprises at least one of a coverage performance or a capacity performance.

9. The method according to claim 2, wherein
a frequency point of the control plane connection in the control plane connection policy of the first-mode network is less than a frequency point of the user plane connection in the user plane connection policy of the second-mode network.

10. The method according to claim 1, wherein
the first-mode network device is a base station of fourth generation mobile communication or a base station of third generation mobile communication;
the second-mode network device is a base station of fifth generation mobile communication.

11. A first-mode network device, comprising:
a memory; and
a processor coupled to the memory and configured to perform the method for establishing multiple based on instructions stored in the memory, comprising:
receiving a connection request sent by a terminal of a user;
according to a priority of the user, selecting a combination of a connection policy of a first-mode network and a connection policy of a second-mode network that is at a level corresponding to the priority of the user, wherein in the case that the user belongs to a contractor operator, the selected connection policy of the first-mode network comprises a control plane connection policy and a user plane connection policy of the first-mode network, and the selected connection policy of the second-mode network comprises a user plane connection policy of the second-mode network; or in the case that the user belongs to a shared operator, the selected connection policy of the first-mode network comprises a control plane connection policy of the first-mode network, and the selected connection policy of the second-mode network comprises a user plane connection policy of the second-mode network;
establishing at least one first-mode network connection with the terminal of the user according to the connection policy of the first-mode network; and
notifying a second-mode network device of information of the connection policy of the second-mode network, so that the second-mode network device establishes at least one second-mode network connection with the terminal of the user according to the connection policy of the second-mode network.

12. A system for establishing multiple connections, comprising:
the first-mode network device according to claim 11; and
a second-mode network device configured to receive information of the connection policy of the second-mode network that is notified by the first-mode network device, and establish at least one second-mode network connection with the terminal of the user according to the connection policy of the second-mode network.

13. The system according to claim 12, wherein
the first-mode network device is a base station of fourth generation mobile communication or a base station of third generation mobile communication;
the second-mode network device is a base station of fifth generation mobile communication.

14. A non-transitory computer-readable storage medium stored a computer program which implements the steps of the method for establishing multiple connections when executed by a processor, comprising:
receiving a connection request sent by a terminal of a user;

according to a priority of the user, selecting a combination of a connection policy of a first-mode network and a connection policy of a second-mode network that is at a level corresponding to the priority of the user, wherein in the case that the user belongs to a contractor operator, the selected connection policy of the first-mode network comprises a control plane connection policy and a user plane connection policy of the first-mode network, and the selected connection policy of the second-mode network comprises a user plane connection policy of the second-mode network; or in the case that the user belongs to a shared operator, the selected connection policy of the first-mode network comprises a control plane connection policy of the first-mode network, and the selected connection policy of the second-mode network comprises a user plane connection policy of the second-mode network;

establishing at least one first-mode network connection with the terminal of the user according to the connection policy of the first-mode network; and notifying a second-mode network device of information of the connection policy of the second-mode network, so that the second-mode network device establishes at least one second-mode network connection with the terminal of the user according to the connection policy of the second-mode network.

15. The device according to claim 11, wherein selecting a combination of a connection policy of a first-mode network and a connection policy of a second-mode network, the level of which corresponds to the priority of the user comprises:
according to the priority of the user and an operator to which the user belongs, selecting the combination of the connection policy of the first-mode network and the connection policy of the second-mode network that is at the level corresponding to the priority of the user and matched with the operator to which the user belongs.

16. The device according to claim 11, wherein selecting a combination of a connection policy of a first-mode network and a connection policy of a second-mode network, the level of which corresponds to the priority of the user comprises:
selecting a combination of a connection policy of a first-mode network and a connection policy of a second-mode network that is at a level corresponding to the priority of the user from frequency points that can be measured by the terminal of the user; or
according to the priority of the user and the operator to which the user belongs, selecting the combination of the connection policy of the first-mode network and the connection policy of the second-mode network that is at the level corresponding to the priority of the user and matched with the operator to which the user belongs from the frequency points that can be measured by the terminal of the user; wherein the connection policy of the first-mode network comprising at least one connection configuration of the first-mode network, each connection configuration of the first-mode network comprising frequency point information and bandwidth information of one first-mode network connection; or
wherein the connection policy of the second-mode network comprising at least one connection configuration of the second-mode network, each connection configuration of the second-mode network comprising frequency point information and bandwidth information of one second-mode network connection.

17. The system according to claim 12, wherein the first-mode network device configured to according to the priority of the user and an operator to which the user belongs, select the combination of the connection policy of the first-mode network and the connection policy of the second-mode network that is at the level corresponding to the priority of the user and matched with the operator to which the user belongs.

18. The system according to claim 17, wherein
in the case that the user belongs to the contractor operator,
the second-mode network device configured to establish at least one user plane connection of the second-mode network with the terminal of the user according to the user plane connection policy of the second-mode network,
the first-mode network device configured to establish at least one control plane connection and at least one user plane connection of the first-mode network with the terminal of the user according to the control plane connection policy and the user plane connection policy of the first-mode network, and turn on a shunt switch for shunting user plane data from the at least one user plane connection of the second-mode network to the at least one user plane connection of the first-mode network, so that the user plane data of the user is transmitted in the at least one user plane connection of the first-mode network and the at least one user plane connection of the second-mode network;
or in the case that the user belongs to the shared operator,
the second-mode network device configured to establish at least one user plane connection of the second-mode network with the terminal of the user according to the user plane connection policy of the second-mode network,
the first-mode network device configured to establish at least one control plane connection of the first-mode network with the terminal of the user according to the control plane connection policy of the first-mode network, and turn off a shunt switch for shunting user plane data from the second-mode network to the first-mode network, so that the user plane data of the user is transmitted in the at least one user plane connection of the second-mode network.

19. The storage medium according to claim 14, wherein selecting a combination of a connection policy of a first-mode network and a connection policy of a second-mode network, the level of which corresponds to the priority of the user comprises:
according to the priority of the user and an operator to which the user belongs, selecting the combination of the connection policy of the first-mode network and the connection policy of the second-mode network that is at the level corresponding to the priority of the user and matched with the operator to which the user belongs.

20. The storage medium according to claim 14, wherein selecting a combination of a connection policy of a first-mode network and a connection policy of a second-mode network, the level of which corresponds to the priority of the user comprises:
selecting a combination of a connection policy of a first-mode network and a connection policy of a second-mode network that is at a level corresponding to the priority of the user from frequency points that can be measured by the terminal of the user; or
according to the priority of the user and the operator to which the user belongs, selecting the combination of the connection policy of the first-mode network and the connection policy of the second-mode network that is at the level corresponding to the priority of the user and matched with the operator to which the user belongs from the frequency points that can be measured by the terminal of the user; wherein the connection policy of the first-mode network comprising at least one connection configuration of the first-mode network, each connection configuration of the first-mode network comprising frequency point information and bandwidth information of one first-mode network connection; or wherein the connection policy of the second-mode network comprising at least one connection configuration of the second-mode network, each connection configuration of the second-mode network comprising frequency point information and bandwidth information of one second-mode network connection.

\* \* \* \* \*